Sept. 29, 1942.   A. BRIECHLE ET AL   2,296,928
PROJECTING APPARATUS
Original Filed Sept. 9, 1938   4 Sheets-Sheet 1

INVENTORS.
Ambrosius Briechle, Roy T. Hurley
and George E. Merritt
BY
F. Bascom Smith
ATTORNEY.

Sept. 29, 1942.   A. BRIECHLE ET AL   2,296,928
PROJECTING APPARATUS
Original Filed Sept. 9, 1938   4 Sheets-Sheet 2
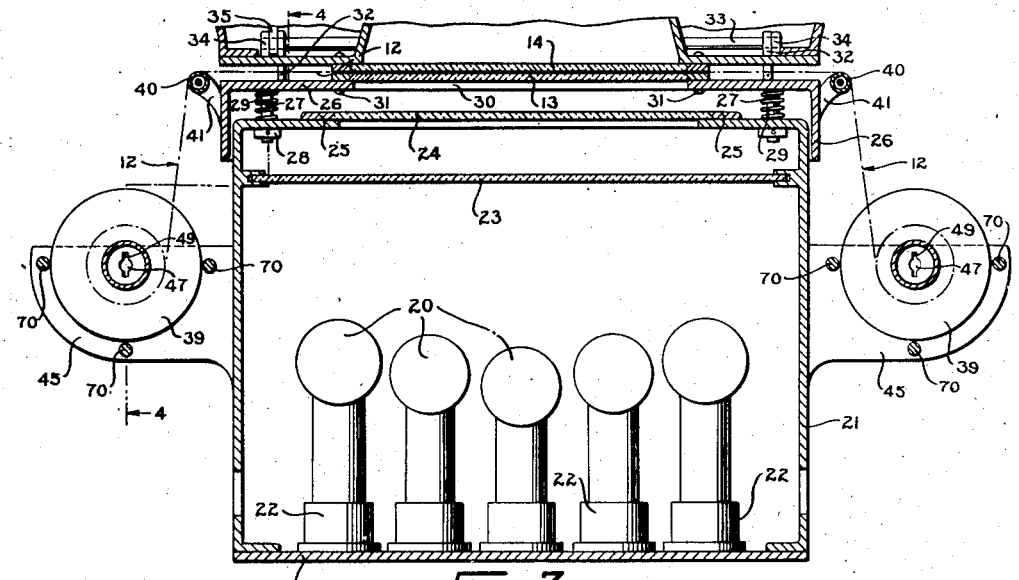
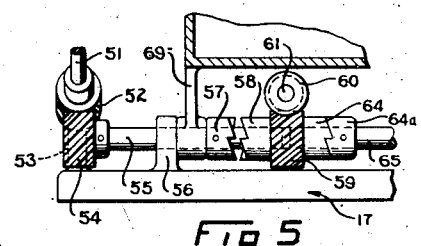
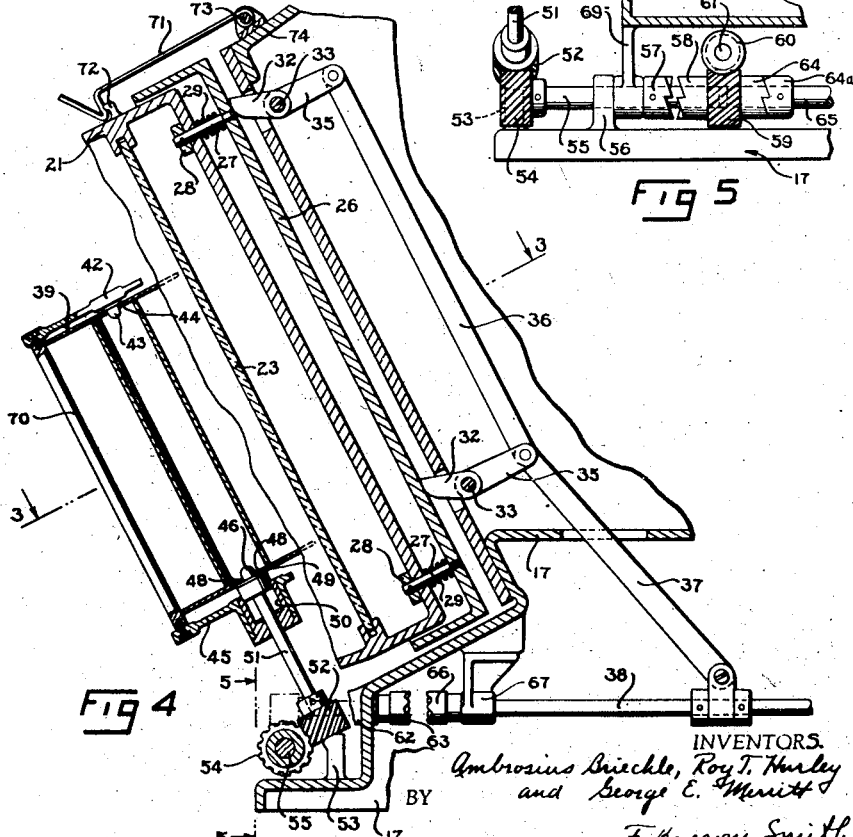
INVENTORS.
Ambrosius Briechle, Roy T. Hurley
and George E. Merritt
BY F. Bascom Smith
ATTORNEY.

Sept. 29, 1942.   A. BRIECHLE ET AL   2,296,928
PROJECTING APPARATUS
Original Filed Sept. 9, 1938   4 Sheets-Sheet 3

INVENTORS.
Ambrosius Briechle, Roy T. Hurley
and George E. Merritt
BY F. Bascom Smith
ATTORNEY.

Sept. 29, 1942.　　　A. BRIECHLE ET AL　　　2,296,928
PROJECTING APPARATUS
Original Filed Sept. 9, 1938　　　4 Sheets-Sheet 4
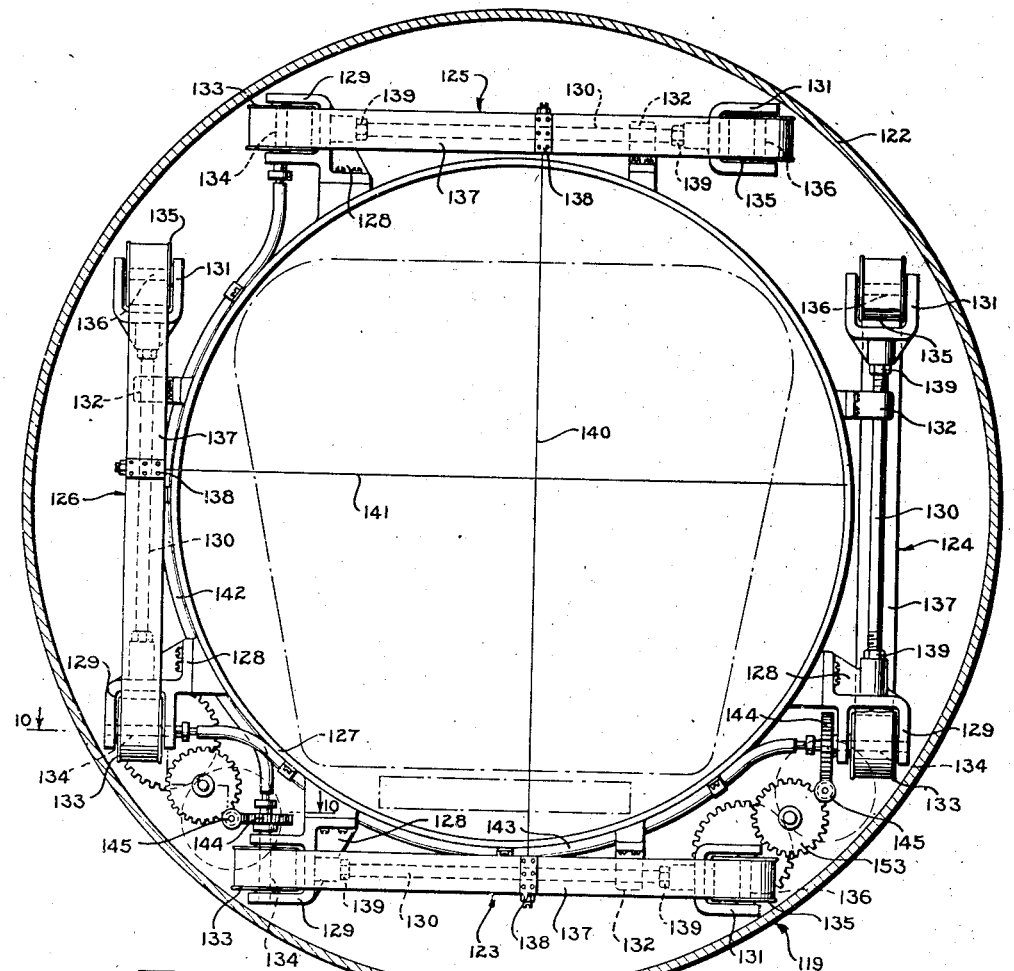
Fig 9
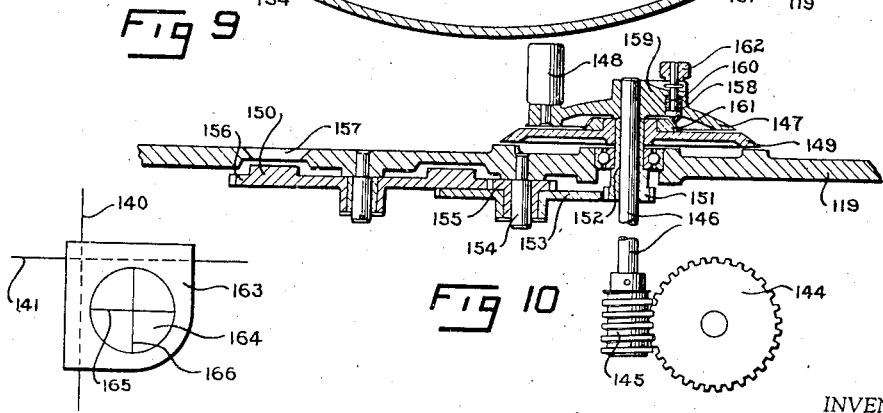
Fig 10
Fig 11
INVENTORS.
Ambrosius Briechle, Roy T. Hurley
and George E. Merritt
BY F. Bascom Smith
ATTORNEY.

Patented Sept. 29, 1942

2,296,928

UNITED STATES PATENT OFFICE 2,296,928

PROJECTING APPARATUS

Ambrosius Briechle, Brooklyn, Roy T. Hurley, Dobbs Ferry, N. Y., and George E. Merritt, Lusby, Md., assignors to Bendix Aviation Corporation, South Bend, Ind., a corporation of Delaware Original application September 9, 1938, Serial No. 229,096. Divided and this application February 26, 1940, Serial No. 320,758

13 Claims. (Cl. 88—24)

This invention relates to apparatus for producing a photographic image and for locating a point on said image.

This application is a division of copending application Serial No. 229,096, for "Apparatus for and method of producing and utilizing a photographic image," filed September 9, 1938.

An object of the present invention is to provide novel apparatus for accurately rectifying and projecting the image of an aerial photograph on a screen.

Another object is to provide the apparatus embodying the above with a novelly located secondary projecting system for producing a conveniently disposed and easily read record of data relating to the main or primary projection.

Still another object is to provide novel means for locating a point on the primary projection.

A further object is to provide novel means for readily and rapidly loading film into position for projection.

Still another object of the invention is to provide novel means for fixing the film in a plane during projection and for accurately centering said film.

A still further object is to provide a novel apparatus embodying the above features which is compactly constructed and which provides a large, clear image of uniform intensity.

The above and further objects and novel features of the invention will more fully appear from the following detailed description when the same is taken in connection with the accompanying drawings. It is to be expressly understood, however, that the drawings are for the purpose of illustration only and are not designed as a definition of the limits of the invention, reference being had for this latter purpose to the appended claims.

In the drawings, wherein like reference characters refer to like parts throughout the several views, Fig. 1 is a front elevation of one embodiment of the apparatus for carrying out the present invention;

Fig. 3 is a somewhat enlarged sectional view taken along line 3—3 of Fig. 2 showing in detail a source of illumination and film carrying mechanism;

Fig. 4 is a sectional view taken substantially along line 4—4 of Fig. 3 showing a form of film metering and film loading mechanism;

Fig. 5 is a rear elevation partly in section, the section being taken along line 5—5 of Fig. 4, and includes the details of a novel reversing film drive and the pivotal mounting of the film holding and illuminating member;

Fig. 9 is a sectional view taken substantially along line 9—9 of Fig. 2 showing in detail the mechanism for locating a point on a projected image in accordance with known data;

Fig. 10 is an enlarged section taken substantially along line 10—10 of Fig. 9; and, Fig. 11 is a top plan view of a device for eliminating parallax in the point locating mechanism.

Figure 2:
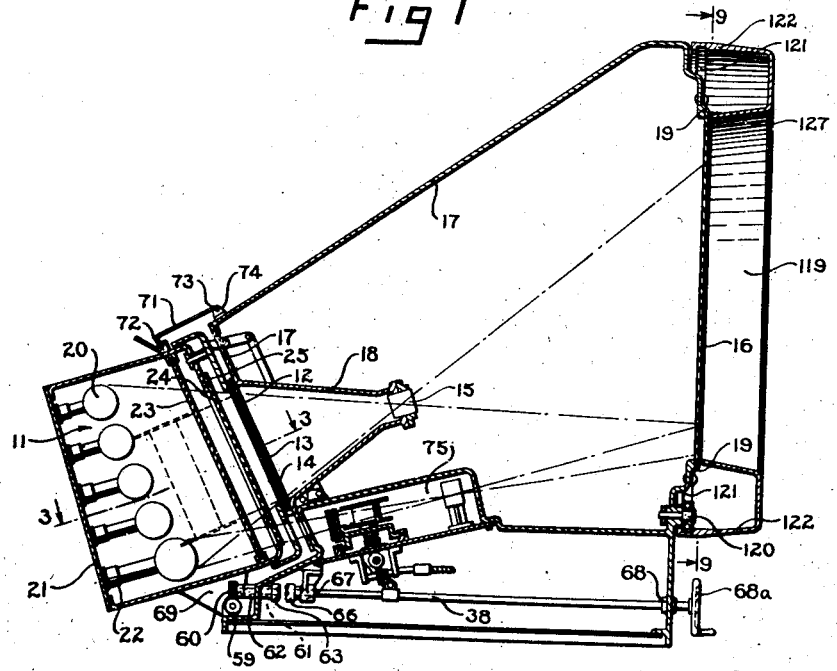
Fig. 2 is a sectional view taken substantially along line 2—2 of Fig. 1.

In the single embodiment illustrated, by way of example, the present invention comprises a main projecting system (Fig. 2) which includes a source of illumination 11, a film 12 fixed between a pair of glass plates 13 and 14, a lens 15 and a ground glass or other suitable translucent screen 16, upon which the image of the film is projected and viewed. Glass plate 14 against the face of which film 12 is resiliently urged by means to be hereinafter described, is suitably fixed to a casing 17 having an inwardly projecting conical portion 18 at the apex of which lens 15 is suitably secured. Screen 16 is secured to casing 17 at the front end thereof by suitable means, such as clamps 19. Thus, an image of photograph or film 12 will be projected upon ground glass 16 whenever the source of illumination 11 is energized. Furthermore, film 12, which is taken by a bombing camera when the latter is inclined at a predetermined angle to the surface of the earth, is fixed in the projecting system by plate 14 in a manner to produce a rectified image on screen 16 when projected.

The source of illumination 11, shown as comprising a group of incandescent lamps 20 (Figs. 2 and 3) is preferably enclosed in a separate housing 21 provided with sockets 22 in which said lamps are mounted. In order to produce a projected image of uniform intensity on ground glass 16, said lamps are of varying sizes, the intensities of illumination thereof being directly dependent upon the degree of enlargement produced thereby. A heat absorbing glass plate 23 is mounted in housing 21, being interposed between lamps 20 and film 14 for the purpose of protecting the film from he heat given off by the lamps. A second glass plate 24, preferably of the same composition and provided for the same purpose, is mounted on the outside of casing 21 by means of brackets 25. A frame 26 in which the glass covered end of housing 21 telescopes is slidably mounted on said housing by means of pins 27 (Figs. 3 and 4) each of which has one end rigidly fixed to frame 26 and the other end extending into said housing. The extending end in each instance has a collar 28 fixed thereon for the purpose of limiting the movement of said plate relative to said housing. Coil springs 29 are interposed between the latter, surrounding pins 27 and urging said plate away from said casing. An opening 30 centrally located in said cover plate is covered by glass plate 13, the latter being secured to said cover plate by suitable means, such as screws 31. Film 12 located between plates 13 and 14 is normally urged into the plane of the face of the latter plate by the pressure of the former.

In order to relieve the film 12 of the force exerted thereon by plate 13 and thereby allow movement of said film, novel means are provided for displacing plate 13 against the expansive pressure of springs 29, said means comprising cam members 32 (Fig. 4) which are adapted to bear against the frame 26 in which plate 13 is mounted and which are fixed to shafts 33, for rotation therewith. The latter are journalled in brackets 34 (Fig. 3) integral with or secured to casing 17 and each has an arm 35 rigidly fixed thereto. The free ends of said arms are joined by a link 36, (Fig. 4) and the latter is in turn connected by means of arm 37 to a shaft 38. When shaft 38 is moved longitudinally to the left as viewed in Fig. 4, arm 37 is moved upward causing link 36 to move likewise and rotate arms 38 in a counter-clockwise direction. Rotation of said arms causes a similar rotation of cam members 32 and thereby displaces frame 26 in the direction of housing 21.

When the pressure upon film 12 is removed, the same becomes free to move and novel means are provided for mounting and moving said film. Film rolls 39 (Figs. 3 and 4) are provided on opposite sides of housing 21 and film 12 is adapted to unwind from one and be wound upon the other, being guided during movement by means of idler rolls 40 suitably journalled on opposite sides of frame 26 in brackets 41 fixed to said frame. Both of said film rolls are similarly mounted between flanges or brackets 42, 45 which extend outwardly from housing 21, being rigidly secured thereto or formed integrally therewith. Upper flanges 42 have centrally located trunnions 43 (Fig. 4) which engage openings 44 in the upper ends of film rolls 39, thereby creating a pivotal support for said ends permitting relative rotation of said film rolls about said trunnions. Lower flanges 45 are provided with trunnions 46 which engage openings 47 in the lower ends of film rolls 39 in a driving connection, said trunnions having upwardly extending prongs 48 which fit into radial slots 49 in said film roll ends. Trunnions 46 are slidably mounted in openings 50 in said lower flanges and when moved downwardly, disengage from film rolls 39. Each of the latter trunnions has a shaft 51 fixed thereto and said shaft extends through the flange and has a helical gear 52 fixed to the end thereof, said gear being adapted to bear against a lug or stop 53 formed with casing 17 and thereby maintain trunnion 46 and prongs 48 in engagement with opening 47 and slots 49.

Novel means are provided for moving film 12 during operation of the projector and comprise a helical gear 54 (Fig. 5) which drivably engages gear 52 and which is mounted on a shaft 55 journalled for rotation in a bracket 56, the latter being formed integrally with casing 17. A toothed clutch member 57 is fixed to shaft 55 and a cooperating clutch member 58 is slidably mounted on said shaft, having a helical gear 59 integral therewith. The latter gear meshes with a gear 60 fixed to shaft 61 (Figs. 2 and 5) which is journalled in a bearing 62 provided therefor in casing 17, said shaft having an end thereof extending into said casing and a jaw clutch element 63 mounted on said end. It is well-known that when one helical gear drives another, a thrust is applied to that other gear along its axis of rotation in a direction depending on the direction of rotation of the first. Therefore, since gear 59 is slidably mounted on shaft 55, rotation of helical gear 60 in a clockwise direction as viewed in Fig. 5 causes gear 59, together with clutch member 58 to move to the left and causes the latter to drivably engage clutch member 57, thereby completing a drive from jaw clutch member 63 to the left film roll 39 of Fig. 3.

In order to make it possible to drive the film in either direction, a similar clutch mechanism comprising members 64 and 64a is provided on the right side of helical gear 59, a shaft 65 being secured to clutch member 64a, shaft 65 is, in turn, connected to the right hand film roll (Fig. 3) by the driving connection hereinbefore described which includes helical gear 52 and trunnion 46. Therefore, when gear 60 is rotated in a counterclockwise direction, shaft 65 is drivably connected by means of clutch members 64, 64a to the right-hand film roll (Fig. 3).

Jaw clutch member 63 from which the film rolls are driven is adapted to engage a clutch member 66 when the latter is moved axially with shaft 38. The latter is suitably journalled in a bracket 67 fixed to casing 17 and a bearing 68 (Fig. 2) integral with said casing and extends beyond the front face of said casing. A readily accessible hand crank 68a is mounted on the extending portion of said shaft and when the latter is moved longitudinally by means of said crank, it causes the jaw clutch to drivably engage so that rotation of said crank will thereafter move film 12. In order to drivably engage the clutch 63, 66 and move film 12, shaft 38 must be moved longitudinally (to the left as seen in Fig. 4) and, as hereinbefore pointed out, this movement causes frame 26 to be displaced relieving film 12 of any frictional forces which might tend to oppose the motion of said film.

As a means for facilitating film loading, housing 21 is pivotally mounted for rotation relative to casing 17 and is adapted to be pivoted, together with film rolls 39 and frame 26, away from said casing during the loading operation. For this purpose, housing 21 is equipped with a pair of downwardly extending hinges or brackets 69 which are mounted on shafts 55 and 65, one of said hinges being shown in Fig. 5. When said housing is moved away from casing 17, film rolls 39 are moved therewith, but helical gears 52 (Fig. 4) tend to remain fixed and therefore said film rolls move upward relative to trunnions 46 to become disengaged from the latter. Thereafter, said film rolls are held in place by rods 70 which are fixed in flanges 42 and 45 and extend therebetween. As shown, three of said rods are provided for each film roll and effect a three-point support for that roll which approximately centers the same. Thus, film rolls 39 are free to be removed and replaced after housing 21 is pivoted away from casing 17 and the film can be threaded readily from one film roll to the other over idler rolls 40. Furthermore, when housing 21 is again pivoted into operative position, the newly positioned film rolls are automatically reengaged by trunnions 46.

Housing 21 is held in operative position by a latch member 71 (Fig. 4) one end of which engages and grasps a lug 72 cast integrally with said housing. The other end of said latch member is pivotally mounted by means of a pin 73 to a bracket 74 secured to casing 17.

In addition to the primary or main projecting system heretofore described, a secondary system for projecting a record of instrument readings made concurrently with the taking of the main film is provided. The latter is shown (Figs. 2 and 6) as utilizing source 11 for illumination and as projecting the recorded readings on screen 16 beneath the main projection. A chamber 75 for housing the secondary film carrying mechanisms is preferably formed in the base of casing 17, said chamber having openings 76 and 77 in opposite end walls thereof so that the light given off by lamps 20 may pass through said chamber to screen 16. At least one side of chamber 75 is open to admit a carriage 78 on which the film carrying mechanism is mounted, said carriage being slidably insertable into said chamber on a pair of guides or tracks 79 fixed to the floor of said chamber by screws 80. Carriage 78 is provided with a pair of downwardly extending flanges 81 to which a pair of runners 82 are secured, the latter being adapted to cooperate with guides 79 to form a means for readily inserting and positioning said carriage in chamber 75. A handle 83 is fixed between a pair of brackets 84 extending from carriage 78 and facilitates the insertion and removal of said carriage into and from chamber 75.

A mask 85 for fixing the plane of secondary film 86 (Fig. 6) during projection is formed by a vertical wall 87 integral with carriage 78 and a hinged member 88 pivotally mounted to the base of said carriage by means such as pins 89 extending through said base and said member. The latter pivots into close engagement with wall 87 and a slot 90 is formed between the two when so engaged, by which film is guided during movement and fixed during projection. Openings 91 are provided in said wall and in said member and register when the two are brought into engagement in order to permit the projection therethrough of the data recorded on the film, said openings are, however, not as wide as slot 90 and, therefore, the edges of the film remain within and guided by said slot. A latch, shown as comprising a resilient element 92 provided with an overlapping portion 92a, is secured to a bracket 93 integral with wall 87 and is adapted to engage and hold hinged member 88 when the latter is moved into contact with said wall.

Figure 1:
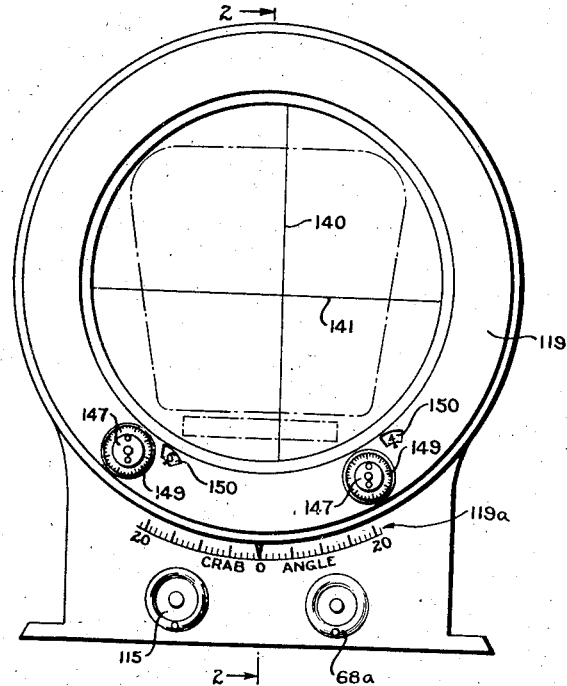
Figure 7:
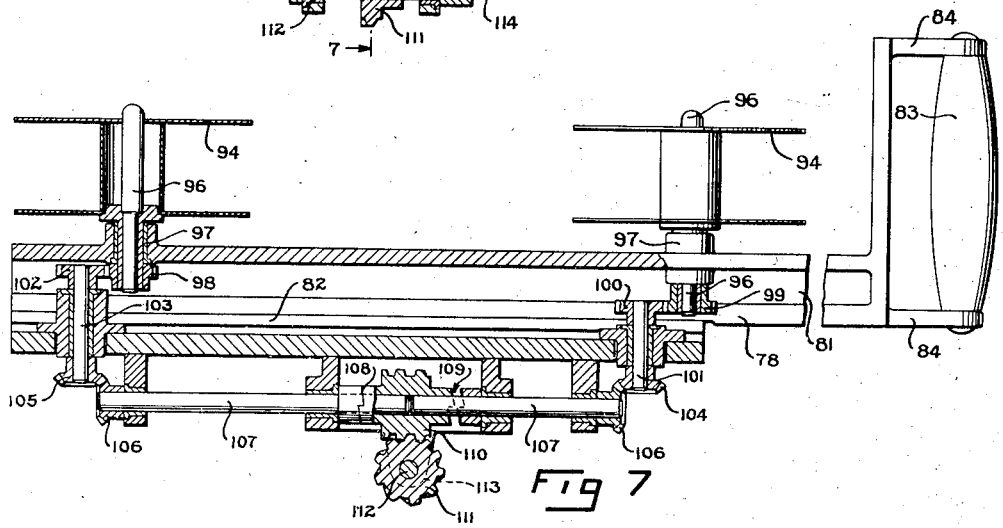
Fig. 7 is a sectional view taken substantially along line 7—7 of Fig. 6.

Secondary film 86 is carried by a pair of film rolls 94 mounted for rotation on carriage 78 and is unwound from one roll, passing over an idler 95 (Fig. 8) through mask 85 and then over a second idler 95 to the second of said rolls being wound thereon. Both film rolls are mounted on and rotatable with vertical shafts 96 which extend through the base of carriage 78 and which are journalled in bearings 97 provided in said base (Fig. 7). Gears 98 and 99 are fixed to said shafts beneath said base at different distances from said base, gear 98 which enters chamber 75 foremost as carriage 78 is inserted being mounted more closely to the base than gear 99. Accordingly, when carriage 78 is inserted into said chamber, gear 98 clears a gear 100 secured to a shaft 101 journalled in the floor of said chamber and engages a gear 102 secured to a shaft 103 journalled in the floor of said chamber further along the path of motion of said carriage. Gear 100 which is mounted on a lower plane than gear 102 engages gear 99 and thus both film roll gears become drivably engaged when carriage 78 is operatively positioned. Shafts 101 and 103 extend beneath the floor of chamber 75 and have bevel gears 104 and 105, respectively, secured thereon. Each of said bevel gears is adapted to be driven from one of a pair of bevel gears 106 meshing therewith. The latter gears are mounted on coaxial shafts 107 driven from a helical gear drive similar to the drive hereinbefore described as actuating film rolls 39 on which the main film is wound. The drive comprises a pair of toothed clutches 108 and 109 operatively mounted on each side of a helical gear 110 which meshes with a second helical gear 111, the engagement of said clutches depending on the thrust imparted by gear 111. The latter gear is secured to a shaft 112 journalled in brackets 113 which are fixed to the floor of chamber 75, said shaft being directly connected to a flexible shaft 114 which is, in turn, operatively connected to a hand crank 115 (Fig. 1). When said hand crank is rotated the secondary film rolls 94 rotate in a direction determined by the direction of rotation of said hand crank and the latter is thereby adapted to move film 86 in either direction during projection.

A bracket 116 secured to the floor of chamber 75 by suitable means, such as screws 117, has a lens 118 mounted therein, said lens being correctly positioned to focus the image of the secondary film on screen 16.

A novel mechanism is provided in the present invention for the purpose of locating a point, such as the theoretical point of impact of a bomb, on the image of the main projected photograph in accordance with the recorded date of the secondary projection. A hollow ring 119 (Fig. 2) is pivotally mounted on the face of casing 17, preferably by means of ball bearings 120 which are fixed to said casing and are engaged by a track or groove 121 provided on the interior of outer wall 122 of said ring. The latter may be rotated relative to casing 17 and a scale 119a preferably calibrated in degrees is provided beneath said ring on casing 17 to indicate the angular displacement of said ring.

Four like pulley systems 123, 124, 125 and 126 (Fig. 9) are secured to inner wall 127 of ring 119, being completely enclosed by and movable with said ring. Opposing systems, namely, systems 124 and 126, and systems 123 and 125, are disposed parallel to each other and each of said systems comprises a bracket 128 which is shown fixed to inner wall 127 and which preferably has a bifurcated member 129 integral therewith. A rod 130 is threadedly secured at one end to said bracket and has a bifurcated member 131 similarly secured at the other end. A bracket 132 fixed to wall 127 provides additional support for rod 130 by having an opening therein through which said rod extends. A pulley 133 is mounted for rotation on a shaft 134 fixed between the arms of bifurcated member 129 and a second pulley 135 is similarly mounted on a shaft 136 extending between the arms of member 131. A belt 137, preferably composed of a spring steel, is passed over said pulleys, the ends of said belt being joined together by a coupling member 138 bolted or pinned thereto. The tension in belt 137 is maintained or varied by rotation of rod 130, the latter being provided with a right-handed thread at one end thereof, and a left-handed thread at the other end, and having bolts 139 mounted thereon for locking the same after adjustment.

Coupling members 138 of belt systems 123 and 125 also serve to securely fix the ends of a crosshair 140 to the belts 137 of said systems, so that said crosshair is stretched tightly across the face of ground glass 16 in proximity to the surface thereof. A second crosshair 141 is similarly mounted across the belts of systems 124 and 126 to intersect crosshair 140 at right angles, each of said crosshairs being adapted to have a parallel motion and always intersect the other at right angles, determining a point on the image by the intersection. In order to insure that a parallel motion of crosshair 140 be maintained, a flexible shaft 142 is provided for connecting the shafts 134 on which pulleys 133 of systems 123 and 125 are mounted, synchronizing the rotary motion of said pulleys. Similarly, a flexible shaft 143 connects pulleys 133 of systems 124 and 126, and controls the motion of crosshair 141.

Each of flexible shafts 142 and 143 is adapted to be actuated from the exterior of ring 119 so that the motion of the respective crosshairs may be governed from the front of the projector. For this purpose, each of said flexible shafts is provided with a worm wheel 144 which is drivingly engaged by a worm 145, the latter being mounted on a shaft 146 (Fig. 10) which extends through the central wall of ring 119. A disc 147, having a knob 48 fixed thereto, is secured to the end of shaft 146 and is readily accessible from the front of the projector for moving the crosshair to which it is connected.

In order to be able to displace the crosshairs a known distance and locate a point on the image in accordance with known data, a pair of calibrated dials 149 and 150 (Fig. 10) is provided for cooperating with each crosshair actuating mechanism. Each pair of dials accurately indicates the angular displacement of disc 147, said angular displacement being a measure of the movement of the crosshair controlled by said disc. Dials 149 and 150 are directly connected to each other by a gear reduction drive comprising a gear 151 integral with a collar 152 on which dial 149 is mounted and which is freely journalled on shaft 146. Gear 151 meshes with a gear 153 pivotally mounted on a shaft 154 pinned to the central wall of ring 119 and drives a smaller gear 155 mounted concentrically with gear 153. Gear 155 in turn engages a gear 156 formed with dial 150 and thereby completes a drive to said dial from dial 149. Accordingly, dial 150 by a suitable choice of gearing may be adapted to give a reading of the number of revolutions rotated by disc 147, while dial 149 gives a reading of the portion of a revolution moved by said disc. The former dial is located within ring 119 and is visible through an opening 157 provided in the face of said ring, whereas the latter dial is mounted on said face concentric with and beneath disc 147. The edge of dial 149 extends beyond the edge of disc 147 and the readings thereon may be viewed from the front of the projector.

Normally, dial 149 is connected to disc 147 and is constrained to move together therewith, recording the amount of movement imparted to the crosshair by said disc. The connecting means between said dial and said disc comprises a pin 158 slidably mounted in a recess 159 provided therefor in disc 147, and normally urged in the direction of dial 149 by a spring 160 interposed between said disc and a shoulder on said pin. A metal plate 161, having a knurled or toothed edge, is mounted on the face of dial 149 and when the base of pin 158, which is also knurled, is held in engagement therewith by spring 160, a driving connection between said dial and disc 147 is effected. Whenever the displacement of each crosshair from a reference point is to be measured, it is desirable that the dials be set at zero when the crosshairs are moved to that reference point. Accordingly, a knob 162 is fixed to the end of pin 158 which extends beyond the outer surface of disc 147, making it possible to manually raise said pin out of contact with plate 161 and disengage the crosshair actuating mechanism from the indicating mechanism so that each might be set independently of the other.

For extremely accurate work, a frame 163 (Fig. 11) may be slidably mounted on crosshairs 140, 141 and actuated thereby. A glass plate 164 is mounted in said frame and has reference lines 165, 166 engraved thereon, the intersection of said lines being used instead of the intersection of the crosshairs to locate a point on the image. By locating the reference lines in the same plane, all parallax is eliminated and the accuracy with which a point may be determined is accordingly increased.

In operation, a roll of film taken during the simulation or an actual bombing flight is removed from the camera, suitably developed and rewound upon a film roll 39, and thereafter loaded into the novel apparatus of the present invention for projection. The film loading operation consists in disengaging latch number 71 from lug 72 (Fig. 2) and causing housing 21 to swing on hinges 69 away from casing 17. With the housing thus displaced, film roll 39 is dropped into one of the two three-point supports constituted by rods 70, and the film 12 is then partially unwound from said film roll and threaded over idler rolls 40 and glass plate 13 and secured to a second film roll 39, which is positioned in the second of the three-point supports formed by rods 70. Housing 21 is now swung back into operative position and latch member 71 is pressed into engagement with lug 72 to lock said housing to casing 17 and to fix a frame of film 12 between plates 13 and 14. Said film frame may thereafter be projected on screen 16 by energizing light bulbs 20 mounted in said housing.

In the interval during which housing 21 is pivoted in a clockwise direction (Fig. 4) to operative position, the film rolls 39 become drivingly engaged by trunnions 93 and 96. Lug 53 limits the motion of shaft 51 and thereby causes movement of film rolls 39 relative to trunnions 46. The latter movement in turn causes openings 47 in said film rolls to be engaged by trunnions 46 and openings 44 to be engaged by trunnions 43.

Accordingly, when it becomes desirable to move film 12 to project a new frame thereof, crank 68a is first moved longitudinally (to the left as viewed in Fig. 2) until clutch member 66 engages member 63, and plates 13 and 14 are separated to free film 12 for movement. Rotation of crank 68 is thereafter transmitted through helical gear 60 to gear 59 and tends to move the latter gear axially to cause one of clutches 57, 58 and 64, 64a to become engaged thereby completing a drive to one of film rolls 39. Further rotation of crank 68a rotates the film roll and moves film 12 through the drive which includes the one of clutches 57, 58 and 64, 64a which is engaged, shaft 55 or 65, depending on which of said clutches is engaged, gear 54, gear 52, and trunnion 46 (Figs. 4 and 5). The above drive from crank 68a permits any desired exposure on film 12 to be located between plates 13 and 14 for projection on screen 16.

Figure 6:
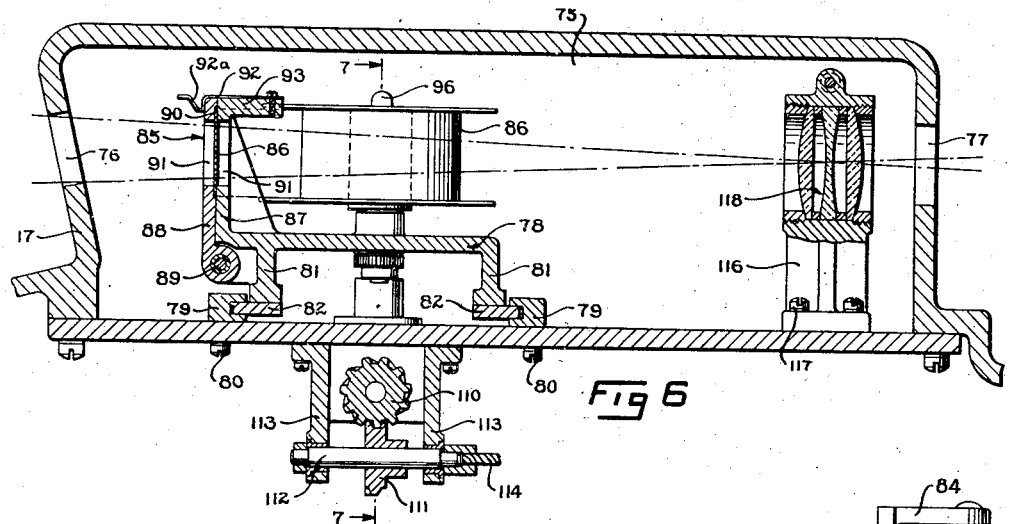
Fig. 6 is an enlarged sectional view of the secondary projecting system shown in Fig. 2 illustrating in detail a film holding carriage and means for mounting the same in operative position.
Figure 8:
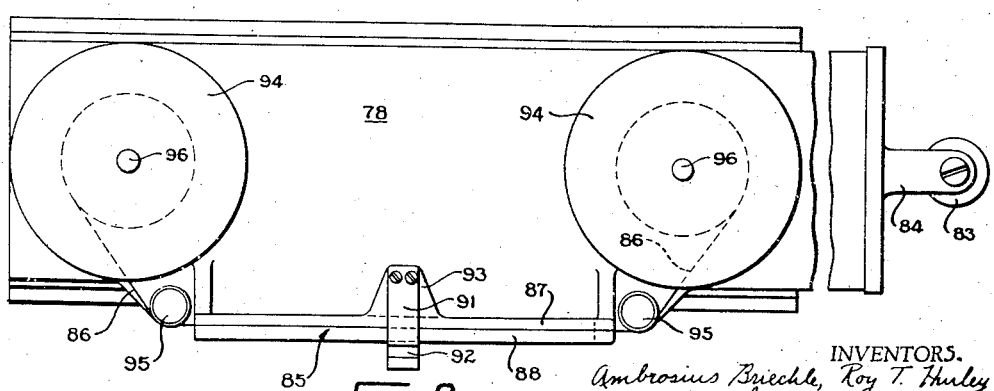
Fig. 8 is a top plan view of the film holding carriage removed from operative position in the projector.

With the main or primary film 12 mounted and positioned for ready movement, the next step in the determination of the theoretical point of impact of a bomb on the projection of the first of each series of photographs is to make available to the operator of the projecting apparatus certain flight data recorded (either photographically or by hand) at the time said photograph is taken. If photographically recorded, the film carrying the record is wound on film roll 94 and the cutter is mounted on one of shafts 96 of carriage 78 (Figs. 6 and 8). The film 86 is threaded over idler rolls 95 and the face of vertical wall 87 to second film roll 94, hinged member 88 being pivoted away from said wall to facilitate said threading. With film 86 thus threaded member 88 is moved into contact with wall 87 and is engaged by latch 91 to form mask 85 and to fix the film in slot 90 of said mask.

Carriage 78 is then slidably inserted into chamber 75 of casing 17, said insertion causing film rolls 94 to become drivingly connected to gears 100 and 102 (Fig. 7) by means of gears 98 and 99, respectively. The frame of film 86 fixed in mask 85 may now be projected on screen 16 by energizing light bulbs 20, the path of light being through openings 76 and 91, lens system 118 and opening 77 to said screen.

When main film 12 is positioned to cause the projection of a new frame thereof, secondary film 86 is correspondingly positioned to project the record of the conditions under which said film frame was taken. The movement of film 86 is effected by rotation of crank 115 which rotates helical gear 111 by means of the flexible cable 114 and actuates the drive to either gear 100 or gear 102, said drive comprising helical gears 111 and 110, clutches 108 and 109, shafts 107 and gears 106, 105 and 104 (Fig. 6).

To determine the point of impact of a theoretical bomb, crosshair 140 is located parallel to a line on the projected image which corresponds to the line of flight of the plane with respect to the ground. Since the photograph is taken with the center line thereof parallel to the longitudinal axis of the plane, the desired parallelism may be produced by rotating ring 119 through an angle equal to the angle at which the plane was crabbed when the photograph was taken. This angle of crab is determined from the first and second photographs of a series in a manner to be hereinafter described and may be measured on scale 119a.

The crosshairs are thereafter moved to a datum point and the two sets of indicating dials 150 and 149 are preferably adjusted to read zero.

The datum point over which the intersection of crosshairs 140, 141 is fixed is the point on the projected image which was directly beneath the plane at the moment the photograph was taken, to be hereinafter referred to as the plumb point. Said plumb point is readily located on the projected image since it bears a fixed relation to the boundaries of each projected image and may be permanently marked off on screen 16. When crosshair 140 coincides with said point, it traces on the projection the line of flight of the plane with respect to the ground and therefore if the actual or imaginary bomb was released at some known interval before or after the photograph was taken, the point of release may be readily determined. The ground speed and the interval as well as the scale of the projection being known, crosshair 141 may be moved along crosshair 140, i. e., along the line of flight, a distance determined from the above data to the point above which the bomb was released.

The drift of the actual or imaginary bomb, i. e., the movement of the bomb at right angles to the path of flight, after release is a function of the altitude and crab angle of the plane, both of which are known so that it is possible to provide a table or alignment chart from which said drift may be picked off. Crosshair 140 is thereafter moved by means of disc 147 from the line of flight a distance which on the projected image is equal to the drift of the bomb, the distance being measured by dials 149 and 150, and said table or chart preferably giving the value of said drift as a reading of said dials.

The forward movement of the bomb in the direction of the line of flight will depend on the speed of the plane, the altitude and the magnitude of the component of wind velocity in that direction. These variables are given or are readily determinable from the recorded flight data and a suitable chart or table gives the readings to which dials 149 and 150 are to be set in order to move crosshair 141 a distance on the main image equivalent to the forward flight of the actual or imaginary bomb from the point of release thereof. When both crosshairs have been thus moved, the point of intersection designates the point of impact of the bomb.

The crab angle of the plane for each bomb release is preferably determined by projecting the first two photographs of each series on screen 16 and locating on the second photograph the object which was the plumb point of the first. The angle between a line joining said object and the plumb point of the second photograph and a line along the vertical center line of the image is the crab angle.

There is thus provided a novel apparatus which incorporates, among other features, a novel means for locating a point on a projected image, and a novel mechanism whereby corresponding exposures on a plurality of separate films may be projected on a single screen. The projecting mechanism includes novel means for loading, mounting and metering one or more films. The apparatus embodying the above novel features is compact in form and produces a large, clear image of uniform intensity on which the various reference points may be readily located.

Although only a single embodiment of the invention has been illustrated and described in detail, it is to be expressly understood that the same is not limited thereto but that various changes may be made therein without departing from the spirit and scope of the invention. For a definition of the limits of the invention, reference will be had primarily to the appended claims.

What is claimed is:

1. In a projecting unit, means for producing an image of a photograph, said means comprising a supporting member, a screen carried by said member, lens means fixed by said member relative to said screen, mechanism for fixing film in the focal plane of said lens, and illuminating means, said mechanism and illuminating means being pivotally mounted relative to said supporting member, and means for metering the film, said last-named means comprising a pair of film roll retaining members carried by said mechanism, a pair of film rolls carried by said film retaining members and driving means centrally engaging said film rolls in one extreme pivotal position of said mechanism and disengaged from said film rolls in the other extreme pivotal position of said mechanism.

2. In a projecting unit, a casing, a screen carried by said casing, a projection chamber in said casing, means for fixing film in a predetermined relation to one end of said chamber, lens means mounted at the other end of said chamber to project images from said film on said screen, metering means for the film, a second projection system in said casing for producing an image on said screen, said system comprising film fixing means, film metering means and lens means, common illuminating means for both of said projection systems, and means operable from the screen end of said casing for actuating each of said metering means.

3. In a projector for producing a rectified image of an aerial photograph and an image of recorded flight data taken at a predetermined time relative to said photograph, a stationary casing, a screen carried by said casing, a pair of separate projection chambers in said casing, film retaining means contained in each of said chambers, lens means mounted in each of said chambers for projecting images on said screen, a common source of light for said chambers, and means for actuating said film retaining means to obtain related images on said screen.

4. In a projecting apparatus of the class described, a housing unit, screen means mounted in said housing unit, a film projecting system for producing rectified images on said screen means, said system comprising lens means, means for fixing a frame of film in the focal plane of said lens means, and means for metering the film, a second projecting system comprising lens means, means for fixing film in the focal plane of said lens means, means for metering the film, said second projecting system being contained in a chamber formed in said housing unit and separate from said first projecting system, common illuminating means for said projecting systems, and means readily accessible from the screen end of said housing unit for actuating the film metering means.

5. In apparatus for producing a rectified image of an aerial photograph and an image of flight data photographically recorded at a predetermined time relative to said photograph, a housing unit, a screen carried by said unit, a film projecting system contained in said housing unit, said system comprising film retaining means, and lens means, a second film projecting system contained in said housing, a pair of chambers in said housing for containing elements of each of said projection systems and for separating the light paths of said systems between the film and lens means thereof, a common illuminating means for said systems, and means for metering the films projected by said systems, said metering means comprising actuating elements operable from the screen end of said housing unit.

6. In a projecting unit, a casing, a screen carried by said casing, a projection chamber in said casing, lens means mounted in said chamber, means including film rolls for mounting a roll of film with a frame thereof in the focal plane of said lens means, a housing for carrying said film mounting means, said housing being pivotally mounted on said casing, illuminating means in said housing, and actuating means operable from the screen end of said casing, said actuating means being connected to the film rolls for metering the film and for holding said rolls against removal, pivotal movement of said housing away from said casing being adapted to disconnect said actuating means from said film rolls.

7. In an image projecting device, a casing, a screen mounted in the front end of said casing, a projection chamber in said casing, lens means mounted in said chamber, means including film rolls for mounting a roll of film with a frame thereof in the focal plane of said lens means, a housing supporting said film mounting means on the exterior thereof, said housing being mounted on the rear end of said casing, illuminating means supported in said housing, and actuating means operable from the screen end of said casing, said actuating means being operatively connected to the film rolls for metering the film and for holding the rolls against removal.

8. In a projecting unit, a casing, a screen at the front end of said casing, lens means mounted in said casing, transparent means mounted at the rear end of said casing in the focal plane of said lens means, means including film rolls for mounting a roll of film with a frame thereof in engagement with said transparent means, a housing carrying said film mounting means on the exterior thereof, illuminating means mounted on the interior of said housing, and drive means operable from the front end of said casing for metering the film and for holding said rolls against removal.

9. In a projecting unit, a casing, a screen at one end of said casing, a projection chamber at the other end of said casing, said chamber comprising lens means and a transparent plate in the focal plane of said lens means, means for mounting a roll of film, said mounting means including film rolls and a member resiliently urging a frame of the roll of film carried by said film rolls into engagement with said transparent plate, a housing carrying said film mounting means on the exterior thereof, said housing being mounted on said casing, illuminating means operatively mounted on the interior of said housing, and drive means operable from the front end of said casing for metering the film and for holding said rolls against removal.

10. In apparatus of the class described, a housing, screen means mounted in one end of said housing, a film projecting system for producing rectified images on said screen means, said system comprising film carrying and metering means, a second projecting system separately contained in said housing for projecting images on said screen means, said second system comprising film carrying and metering means, common illuminating means for said system carried by said housing, and separate means operable from the screen end of said housing for actuating each of said film carrying and metering means.

11. In apparatus of the class described, a housing, screen means mounted on said housing, a film projecting system for producing images on said screen means, said system comprising film carrying means, metering means and lens means, a second projecting system separately contained in said housing for projecting images on said screen, said second system comprising film carrying means, metering means and lens means, and means operable from the front end of said housing for actuating each of said film metering means.

12. In a projecting unit, means for producing an image of a photograph, said means comprising a casing, a screen carried by said casing, lens means mounted in said casing, illuminating means, and mechanism for fixing film in the focal plane of said lens means, said mechanism being pivotally mounted relative to said casing, and means for metering the film, said last-named means comprising a pair of film rolls, retaining members for said film rolls, said film rolls and retaining members being carried by said mechanism, and driving means operatively engaging said film rolls in one extreme pivotal position of said mechanism and being disengaged from said film rolls in the other extreme pivotal position of said mechanism.

13. In a projecting unit, means for producing an image of a photograph, said means comprising a supporting member, a screen carried by said member, lens means mounted in said member, illuminating means mounted on said member and mechanism for fixing film in the focal plane of said lens means, said mechanism being pivotally mounted relative to said supporting member, and means for metering the film, said last-named means comprising means for mounting a roll of film and drive means engaging said film mounting means in one extreme pivotal position of said mechanism and disengaged from said film mounting means in the other extreme pivotal position of said mechanism.

AMBROSIUS BRIECHLE.
ROY T. HURLEY.
GEORGE E. MERRITT.